US006917452B2

(12) United States Patent
Beeman

(10) Patent No.: US 6,917,452 B2
(45) Date of Patent: Jul. 12, 2005

(54) SYSTEM AND METHOD FOR PROVIDING UNIFORM ILLUMINATION AS RECEIVED BY AN OPTICAL DETECTOR

(75) Inventor: Edward S Beeman, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 644 days.

(21) Appl. No.: 09/838,974

(22) Filed: Apr. 20, 2001

(65) Prior Publication Data

US 2002/0154344 A1 Oct. 24, 2002

(51) Int. Cl.⁷ .................................................. H04N 1/04
(52) U.S. Cl. ....................... 358/475; 358/484; 362/551; 362/552; 362/582; 399/220; 355/67
(58) Field of Search .............................. 358/475, 509, 358/484, 474, 505, 487, 506, 483, 482, 473; 362/552, 558, 551, 260, 16, 84, 800, 257, 311, 555, 560; 250/234–236, 208.1, 227.11, 216, 221.31, 227.31, 227.26; 382/312, 318, 319; 399/177

(56) References Cited

U.S. PATENT DOCUMENTS

| | | | | |
|---|---|---|---|---|
| 5,966,221 A | * | 10/1999 | Tellam et al. | 358/475 |
| 5,969,343 A | * | 10/1999 | Nakamura et al. | 250/227.31 |
| 6,204,938 B1 | * | 3/2001 | Horiuchi et al. | 358/484 |

FOREIGN PATENT DOCUMENTS

JP          090050510 A      2/1997

* cited by examiner

*Primary Examiner*—Cheukfan Lee

(57) ABSTRACT

The present invention is directed to a system and method which capture images by use of an optical detector. The system and method illuminate a scan region utilizing a bulb that emits light of greater intensity near its extremities than at its center to provide image light to an optical detector via an optical reduction component.

5 Claims, 2 Drawing Sheets

SYSTEM AND METHOD FOR PROVIDING UNIFORM ILLUMINATION AS RECEIVED BY AN OPTICAL DETECTOR

TECHNICAL FIELD

The present invention is generally related to optical scanning and more particularly to a scanning system and method that provide more uniform illumination as received by an optical detector.

BACKGROUND

Optical scanning devices are well-known in the art and produce machine-readable data signals representative of an object or document being scanned by projecting an image of the document onto a photosensitive detector. The electrical signals produced by the photosensitive detector may then be digitized and processed as necessary to produce an image of the scanned object on a suitable display device, such as, for example, the display of a personal computer. If the object being scanned is text, then the data signals may be converted into text data by a suitable optical character recognition (OCR) program or device.

A typical optical scanner may include illumination and optical systems to accomplish scanning of the object. The illumination system illuminates a portion of the object (referred to herein as a "scan region"), and the optical system collects light (referred to herein as "image light") reflected by the illuminated scan region and focuses an line across the entire length of the object (referred to herein as a "scan line") onto the surface of the photosensitive detector. The illumination system generally provides a xenon lamp, a fluorescent lamp, and/or the like to provide a light source. The light source generally provides a light signal that is relatively constant across its surface area. Also, known optical scanners utilize a scan line having a length corresponding to the maximum expected document width, typically about 8.5 inches.

Known scanners capture image light utilizing a charge-coupled device (CCD). A charge-coupled device is a semiconductor device that is typically much smaller than the scan line. Accordingly, the optical system generally comprises an optical component (such as a lens) to perform image reduction. Specifically, the optical component causes the image light associated with the full width of the scan line to be optically reduced so that the received image light is captured by the smaller surface of the CCD semiconductor device.

Also, known scanners implement the scanning CCD as a single series of elements or pixels. Individual pixels or elements of the CCD are in essence photosensitive capacitors. Specifically, the pixels proportionally convert incident light received on a specific segment of the scan line into an electronic charge by trapping the charge in a depletion region of semiconductor material. Since each element or pixel acts in much the same way as a capacitor, a CCD requires an amount of time to receive sufficient light to capture an image. Eventually, the amount of incident light received over a period of time by a CCD is determined by sampling voltages associated with each pixel or element. The sampled voltages represent the brightness of the light received at the respective segments of the CCD.

Image data representative of the entire object may be obtained by sweeping the scan line across the entire object, usually by moving the illumination and optical systems with respect to the object, although it is possible to move the object instead. The sweeping process includes moving the scan line to a specific location, illuminating the locations, allowing the CCD to charge, serially sampling and outputting the voltages. The sampled voltages are converted to digital data via an A/D converter. The digital data is outputted for storage in memory.

However, the geometry associated with known scanning applications is problematic. Specifically, the use of a relatively small CCD element with an associated reduction optical component creates a "roll-off" effect. Due to the geometry of the system and the optical properties of the reduction components, significantly less light is captured from portions of the scan line disposed at more extreme angles. Specifically, significantly less light is captured at the edge of the image than at the center of the image.

Known optical scanning applications attempt to compensate for the roll-off effect by digital signal processing. The digital data is modified by increasing the values associated with specific pixels by a function of the pixel distance from the center of the CCD. However, this adaptation is not an optimal solution. Specifically, the digital signal processing does nothing to augment the reduced signal-to-noise ratio associated with the roll-off effect. Secondly, the digital compensation approach places greater computational complexity into the scanning process.

Alternatively, known optical scanning applications insert attenuating apertures in the light path to adjust to the roll-off effect. A lens associated with the optical system is shaped so as to limit the amount of light received from the middle of the lens. The variation of the lens aperture creates a masking effect, i.e. a portion of light received from the center of the scan line is not received by the CCD. This does create greater uniformity of received image light. However, this occurs at the expense of wasting power associated with the image light, thereby decreasing the signal-to-noise ratio and image quality.

SUMMARY OF THE INVENTION

The present invention is directed to a system and method which capture images by use of an optical detector. The system and method illuminate a scan region utilizing a bulb that emits light of greater intensity near its extremities than at its center to provide image light to an optical detector via an optical reduction component.

DETAILED DESCRIPTION

Figure 1:
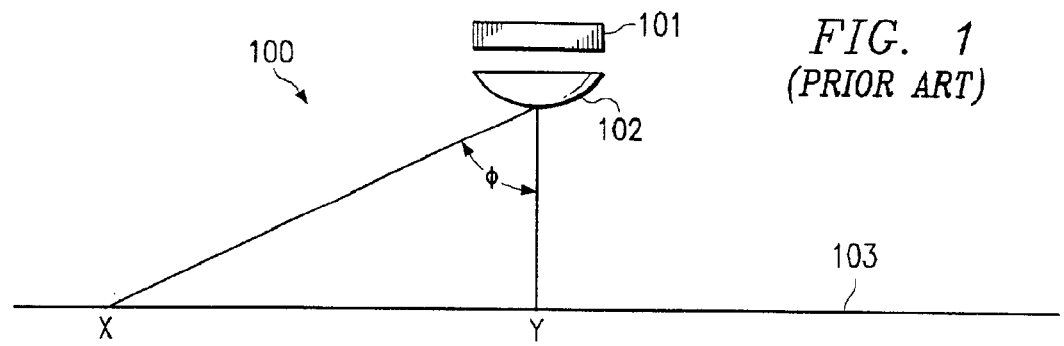
FIG. 1 depicts the geometry associated with known scanning applications.

FIG. 1 depicts a block diagram utilized to illustrate the geometry associated with optical scanners that gives rise to the roll-off effect. System 100 is representative of known scanning applications. System 100 includes optical detector 101. Optical detector 101 captures the image light and digitizes the received image light to construct a digital image of scan line 103. Optical detector is relatively small in comparison to scan line 103. Accordingly, system 100 includes optical component 102 (e.g., a lens) which operates to reduce the image light received from the scan region to be received across the cross-sectional area of optical detector 101. It shall be appreciated that system 100 is represented at a relatively high level. Specifically, the actual geometry of scanning applications is more complicated due to the use of mirrors and other optical components. However, system 100 comprises sufficient detail to convey the optical characteristics of scanning applications.

Now, point Y is located on the center of scan line 103 which is directly underneath optical component 102. However, point X is located on the extremity of scan line 103 and is approximately disposed at angle Ø. The difference causes the intensity of the light received by optical detector 101 and associated with point X to be substantially reduced in comparison to the intensity of the light associated with point Y. The optical properties of optical component 102 reduce the intensity of the light detected from point X. Specifically, almost all of the light reflected by point Y is received by optical detector 101. However, only a portion of the light reflected by point X is received by optical detector 101. In one mathematical approach utilized to model the roll-off effect, the relative reduction in the intensity of received light is given by the function: $(\cos \emptyset)^4$.

Figure 2:
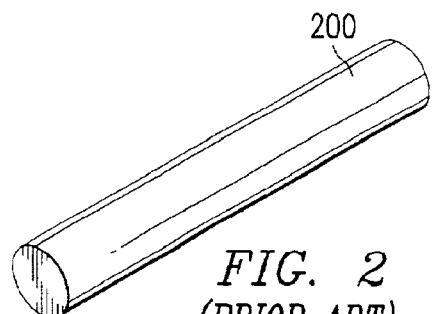
FIG. 2 depicts an illumination bulb associated with known scanning applications.

FIG. 2 depicts a light source that is utilized by known scanning applications. Specifically, bulb 200 is a cylindrical bulb that contains phosphorescent material. Since the profile of bulb 200 is substantially uniform, the intensity of light emitted by bulb 200 is substantially uniform across its length. This causes the scan region to be uniformly illuminated. However, the roll-off effect causes significantly less light to be received from high Ø locations. Therefore, the light actually received across the length of an optical detector varies significantly, when bulb 200 is utilized in an optical system such as system 100.

Figure 3:
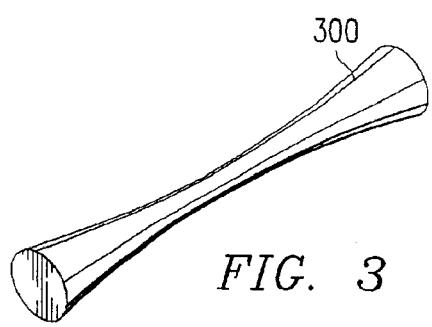
FIG. 3 depicts an illumination bulb adapted to be utilized with the present invention.

FIG. 3 depicts bulb 300 which is adapted according to a preferred embodiment of the present invention. Bulb 300 depicts a non-linear configuration. Specifically, bulb 300 is relatively narrow at its center. Moving away from the center, the diameter of bulb 300 gradually increases. At either end of bulb 300, the diameter of bulb 300 preferably substantially increases. By utilizing such a configuration, a larger surface area is created near the extremity of bulb 300. Additional phosphorescent material is disposed across the additional surface area. The intensity of illumination at the extremity of bulb 300 is substantially greater than the intensity of illumination at the center. The disparate illumination intensity compensates for the roll-off effect experienced by systems such as system 100. Therefore, illumination received by an optical detector from bulb 300 is substantially more uniform than illumination received by an optical detector from bulb 100. It shall be appreciated that other bulb designs may be utilized to achieve the desired illumination pattern as will be discussed in greater detail below with respect to FIGS. 5B, 5C, 6, and 7.

Figure 4:
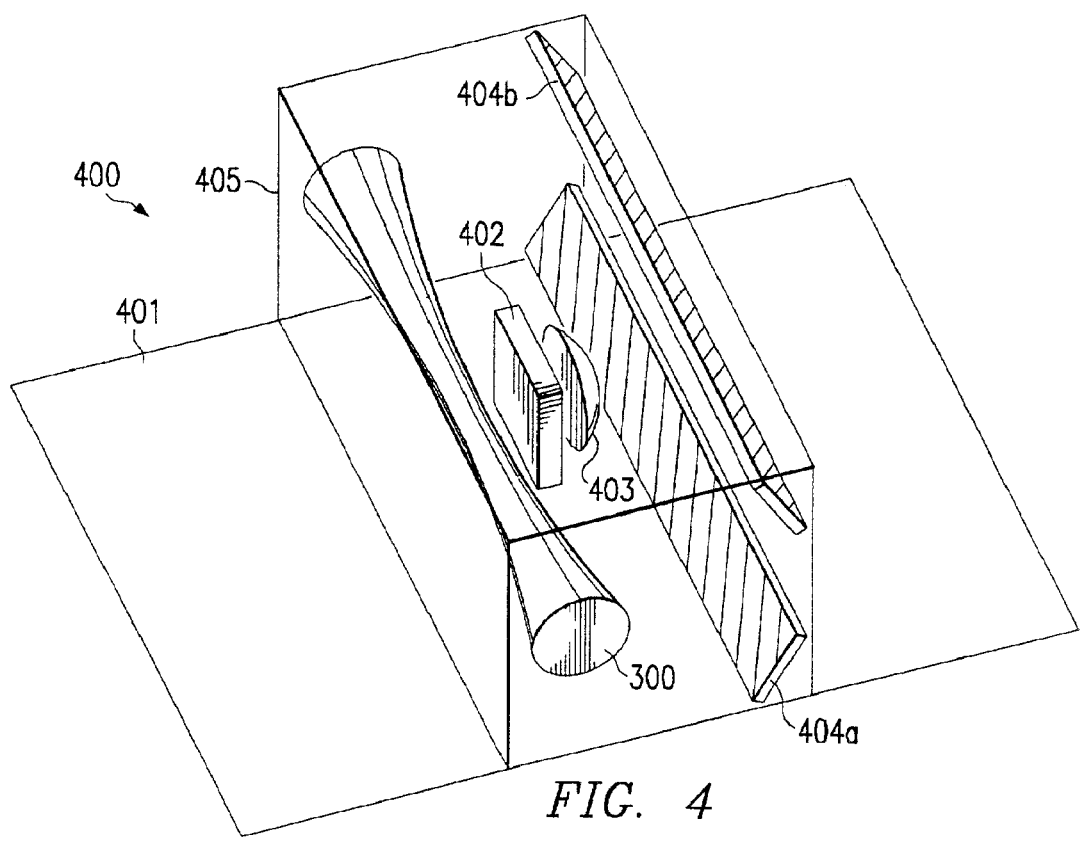
FIG. 4 depicts a block diagram of a scanning apparatus utilizing the present invention.

FIG. 4 illustrates a preferred embodiment of the present invention. System 400 depicts a block diagram of a scanning apparatus. It shall be appreciated that system 400 is depicted at a relatively high level and does not illustrate each and every component that may be included in an actual implementation. System 400 only illustrates sufficient detail to permit one of ordinary skill in the art to construct and utilize a scanner according to the present invention.

System 400 comprises scan region 401. A photograph, document, and/or the like may be disposed on scan region 401 for image digitization. The digitized image may be subsequently transferred to another system such as a personal computer. System 400 further comprises carriage 405. The image digitization process occurs by sweeping carriage 405 over scan region 401. Carriage 405 further comprises an illumination component and optical components. Specifically, carriage 405 comprises optical detector 402 to capture the image light. Optical detector 402 may be implemented via a CCD. Alternatively, optical detector 402 may be implemented via a cathode ray tube (CRT). Carriage 405 further comprises lens 403. Lens 403 reduces the image light so that the entire image associated with a scan line is received by optical detector 402. Carriage 405 further comprises a series of mirrors (404a and 404b) to redirect image light from the scan region toward lens 403. Also, carriage 405 includes bulb 300 to illuminate a portion of scan region 401 that is to be digitized.

It shall be appreciated that the present solution is quite advantageous in comparison to known techniques. Specifically, the roll-off effect is mitigated while the signal-to-noise ratio is increased. It shall further be appreciated that the present invention is not limited to optical scanners. Specifically, the present invention may be utilized by any number of applications. For example, the present invention may be utilized in connection with any number of optical applications such as fax machines, copiers, and/or the like.

Figure 5A:
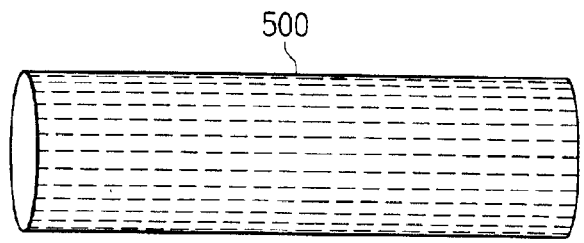
FIG. 5A depicts a prior art phosphor coating for a fluorescent lamp.
Figure 5B:
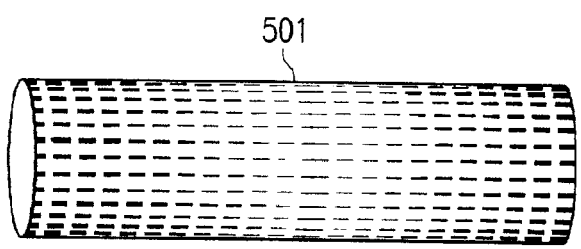
FIG. 5B depicts an embodiment of the inventive variable density fluorescent lamp.
Figure 5C:
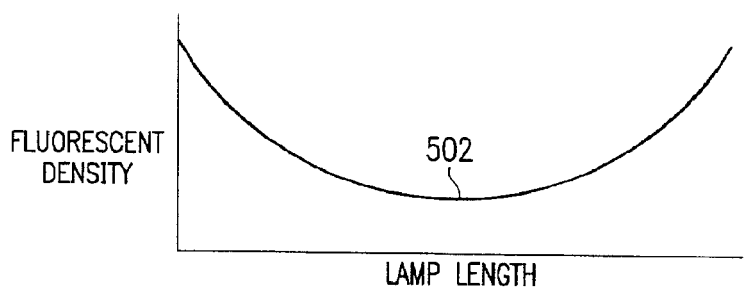
FIG. 5C depicts a graph showing the variable density of the lamp of FIG. 5B.
Figure 6:
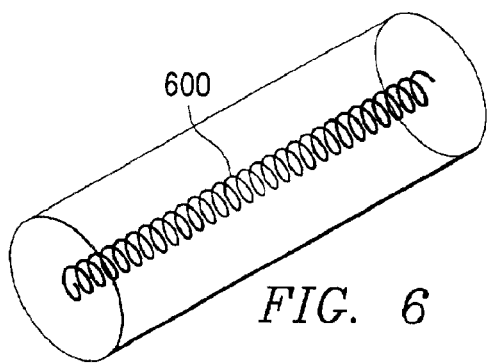
FIG. 6 depicts an incandescent bulb formed according to the present.
Figure 7:
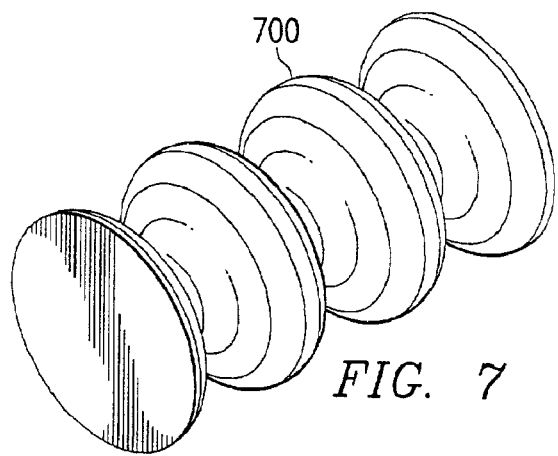
FIG. 7 depicts a bulb formed according to an embodiment of the present invention including several local extrema.

FIG. 5A depicts ordinary phosphor coated fluorescent lamp 500. In known fluorescent lamps, the phosphor or other fluorescent material is applied evenly over the interior surface of the bulb. Accordingly, the illumination is substantially uniform. FIG. 5B depicts an alternative bulb that may be utilized in connection with the present invention. Specifically, FIG. 5B depicts ordinary shaped bulb 501 which possesses variation in the fluorescent coating density. In other words, bulb 501 is gradiently coated with fluorescent material. The fluorescent density is relatively small at the bulb center and, at first, gradually increases away from the center of the bulb as depicted in FIG. 5C. It shall be appreciated that profile 502 as depicted in FIG. 5C is by way of example only, as other profiles could be used, e.g., $X^2$, $X^4$, parabolic, hyperbolic, a series of discrete steps, etc. The fluorescent density increases relatively rapidly near the extremity of the bulb. Thus, the illumination produced is substantially greater near the extremity of the bulb, since the intensity of illumination of a fluorescent lamp is related to the fluorescent density. FIG. 6 depicts an incandescent bulb adapted according to the present invention. Filament 600 of the incandescent bulb is wound in such a manner that its coil density is varied across its lateral profile to thereby produce substantially greater illumination at the extremity of the bulb. It shall be appreciated that coil density can be effected in at least two ways. One way is by varying the spacing between the loops, while another way is by varying the thickness of the wire used to form the loops. FIG. 7 depicts bulb 700 with several local extrema. Bulb 700 may be utilized in a system that possesses several optical detectors thus requiring a more complicated illumination pattern. It shall be appreciated that the illumination pattern produced by the bulb shape shown in FIG. 7 may also be provided using a bulb with varying density of fluorescent material, as shown in FIG. 5B, or the density of the incandescent filament as shown in FIG. 6.

What is claimed is:

1. A bulb for providing light, said bulb comprising:
a central portion that emits light of lesser intensity than distal portions, wherein said bulb possesses a greater density of phosphorescent material at distal portions of said bulb than at said central portion.

2. A system for capturing an image by an optical detector, said system comprising:
an illumination system to illuminate a scan region, wherein the illumination system includes a bulb that emits light of greater intensity near its extremities than at its center, and wherein the illumination system comprises a bulb that possesses a greater density of phosphorescent material at distal portions of said bulb than at a central portion of said bulb; and
an optical reduction component to reduce image light for receipt by said optical detector.

3. The system of claim 2 wherein the diameter of the bulb near its ends is wider than the diameter of the bulb at its center.

4. The system of claim 2 wherein the diameter of the bulb increases gradually moving away from the bulb's center and wherein the diameter of the bulb increases more rapidly near the bulb's ends.

5. The system of claim 2 wherein the system is a device selected from the list of:
scanner;
copier; and
fax.

* * * * *